US010901398B2

(12) United States Patent
Ueyama et al.

(10) Patent No.: US 10,901,398 B2
(45) Date of Patent: Jan. 26, 2021

(54) CONTROLLER, CONTROL PROGRAM, CONTROL SYSTEM, AND CONTROL METHOD

(71) Applicant: OMRON Corporation, Kyoto (JP)

(72) Inventors: Yuhki Ueyama, Kyoto (JP); Nobuyuki Sakatani, Otsu (JP); Yasuaki Abe, Ibaraki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/900,847

(22) Filed: Feb. 21, 2018

(65) Prior Publication Data
US 2018/0284733 A1    Oct. 4, 2018

(30) Foreign Application Priority Data

Mar. 31, 2017  (JP) ................................. 2017-072475

(51) Int. Cl.
*G05B 19/418*    (2006.01)
*G05B 19/042*    (2006.01)
*G05B 23/02*    (2006.01)

(52) U.S. Cl.
CPC ..... *G05B 19/4184* (2013.01); *G05B 19/0428* (2013.01); *G05B 23/0272* (2013.01);
(Continued)

(58) Field of Classification Search
CPC ............ G05B 19/4184; G05B 19/0428; G05B 23/0272; G05B 2219/1105; G05B 2219/1134; G05B 2219/13004
See application file for complete search history.

(56) References Cited

U.S. PATENT DOCUMENTS 5,654,632 A  *  8/1997  Ohno .................... H01L 22/20
                                                       257/E21.525
6,026,348 A      2/2000  Hala
              (Continued)

FOREIGN PATENT DOCUMENTS

CN          106063197 A       10/2016
JP          S60-186717 A       9/1985
              (Continued)

OTHER PUBLICATIONS

Japanese Office Action dated Feb. 26, 2019 in a counterpart Japanese patent application.
(Continued)

*Primary Examiner* — Thomas C Lee
*Assistant Examiner* — Michael Tang
(74) *Attorney, Agent, or Firm* — Metrolex IP Law Group, PLLC

(57) ABSTRACT

A controller includes a control operation unit that cyclically performs a control operation for controlling a control target, a data generator that generates data showing a chronological change in a value associated with a control target, and an analyzer that analyzes the data and outputs an analysis result in a predetermined analysis target period. The analysis target period includes a plurality of sections. The data generator sequentially outputs section data showing a chronological change in a value for each of the plurality of sections in the analysis target period. The analyzer analyzes the sequentially output section data for each section. When an analysis of section data for a section in the analysis target period shows a predefined result, the analyzer eliminates an analysis of section data for one or more sections in the analysis target period that are subsequent to the section for which the analysis shows the predefined result.

13 Claims, 13 Drawing Sheets

(52) U.S. Cl.
CPC ............... *G05B 2219/1105* (2013.01); *G05B 2219/1134* (2013.01); *G05B 2219/13004* (2013.01)

(56) References Cited

U.S. PATENT DOCUMENTS

| | | | |
|---|---|---|---|
| 2009/0112478 A1* | 4/2009 | Mueller, Jr. | A61B 5/14532 |
| | | | 702/19 |
| 2010/0185414 A1* | 7/2010 | Yamamoto | B60W 50/0205 |
| | | | 702/183 |
| 2012/0078404 A1 | 3/2012 | Saito et al. | |
| 2012/0224827 A1* | 9/2012 | Tano | G07C 5/0858 |
| | | | 386/227 |
| 2014/0297685 A1 | 10/2014 | Nojima | |
| 2014/0358487 A1 | 12/2014 | Shin | |
| 2016/0191389 A1 | 6/2016 | Kobayashi et al. | |
| 2017/0099158 A1 | 4/2017 | Mizutani et al. | |
| 2017/0206034 A1* | 7/2017 | Fetik | G06F 3/0653 |

FOREIGN PATENT DOCUMENTS

| | | | |
|---|---|---|---|
| JP | S61-223906 A | | 10/1986 |
| JP | H07-43746 A | | 2/1995 |
| JP | H7-191740 A | | 7/1995 |
| JP | 2000-515288 A | | 11/2000 |
| JP | 2003-296851 A | | 10/2003 |
| JP | 2005-350972 A | | 12/2005 |
| JP | 2007-003385 A | | 1/2007 |
| JP | 2010-93047 A | | 4/2010 |
| JP | 2010093047 A | * | 4/2010 |
| JP | 2016-051447 A | | 4/2016 |
| JP | 5925287 B1 | | 5/2016 |

OTHER PUBLICATIONS

Extended European search report (EESR) dated Aug. 23, 2018 in a counterpart European patent application.
Japanese Office Action dated Jul. 16, 2019 in a counterpart Japanese patent application.
Office Action dated May 26, 2020 in a counterpart Japanese patent application.
Office Action dated Jul. 31, 2020 in a counterpart Chinese patent application.

* cited by examiner

Coordinate space represented by feature quantities

FIG. 14

| Number of abnormality determinations | 3582 |
|---|---|
| Number of abnormalities | 30 |
| Abnormality determination section | |
| First section | 1 |
| Second section | 3 |
| Third section | 3 |
| Fourth section | 10 |
| Fifth section | 8 |
| Sixth section | 5 |

| Abnormal occurrence time | Workpiece number |
|---|---|
| 12:25:00:30 | W38298 |
| 12:40:33:10 | W39287 |
| 13:05:15:40 | W41583 |
| 13:24:58:00 | W42585 |
| ... | ... |

CONTROLLER, CONTROL PROGRAM, CONTROL SYSTEM, AND CONTROL METHOD

CROSS REFERENCE TO RELATED APPLICATIONS

This application claims priority from prior Japanese Patent Application No. 2017-072475 filed with the Japan Patent Office on Mar. 31, 2017, the entire contents of which are incorporated herein by reference.

FIELD

The disclosure relates to a controller that can analyze data, a control program executed in the controller, a control system including the controller, and a control method implemented by the controller.

BACKGROUND

Factory automation (FA) technology involving controllers, such as programmable logic controllers (PLCs), has been widely used at various production sites. Typically, such controllers cyclically perform control operations for controlling a control target in predetermined system cycles. Besides such control operations performed cyclically, several supplemental processes may be performed. Such supplemental processes include transmitting collected input data to a host device or analyzing collected input data.

Such analysis may include determining the presence of an abnormality by comparing input data collected within a period of time with predetermined determination indexes. As one such method for determining the presence of an abnormality, Japanese Unexamined Patent Application Publication No. 2010-093047 (Patent Literature 1) describes a method for detecting an abnormality by comparing obtained waveform data with predetermined waveform data. Using the results of such analysis, control may be performed in accordance with any detected abnormality.

CITATION LIST

Patent Literature

Patent Literature 1: Japanese Unexamined Patent Application Publication No. 2010-093047

SUMMARY

Technical Problem

Comparing the data collected within a predetermined period of time with the determination indexes as described above involves evaluating all the items of data. This lengthens the time taken for the analysis. The analysis that takes a long time can cause a noticeable delay before the analysis results are fed back in the control.

In response to the above demand, one or more aspects are directed to a mechanism that can reduce the time taken to output analysis results in an analysis of data collected within a predetermined period of time.

Solution to Problem

A controller according to a first aspect includes a control operation unit that cyclically performs a control operation for controlling a control target, a data generator that generates data showing a chronological change in a value associated with a control target, and an analyzer that analyzes data generated by the data generator and outputs an analysis result in a predetermined analysis target period. The analysis target period includes a plurality of sections. The data generator sequentially outputs section data showing a chronological change in a value for each of the plurality of sections included in the analysis target period. The analyzer analyzes the sequentially output section data for each section. When an analysis of section data for a section included in the analysis target period shows a predefined result, the analyzer eliminates an analysis of section data for one or more sections in the analysis target period that are subsequent to the section for which the analysis shows the predefined result.

In one or more embodiments, the controller further includes a storage unit that stores a determination index used in an analysis of section data for each of the plurality of sections.

In one or more embodiments, the analyzer uses an analysis result of section data for a preceding section included in the analysis target period to analyze section data for a subsequent section included in the analysis target period.

In one or more embodiments, the analyzer determines whether an integration of an analysis result of section data for each section included in the analysis target period satisfies a predetermined evaluation criterion.

In one or more embodiments, the controller further includes a setting reception unit that receives a setting of the evaluation criteria. In one or more embodiments, the controller further includes an execution control unit that causes a control operation by the control operation unit and data generation by the data generator to be performed with a higher priority than an analysis performed by the analyzer.

In one or more embodiments, the plurality of sections are defined based on a chronological change in a value associated with the control target in a normal state.

In one or more embodiments, the plurality of sections are defined to allow a chronological change in a value associated with the control target to be visible.

A second aspect provides a control program executed by the controller. The control program causes the controller to implement cyclically performing a control operation for controlling a control target, generating data showing a chronological change in a value associated with the control target, and analyzing the generated data and outputting an analysis result in a predetermined analysis target period, the analysis target period including a plurality of sections. Generating the data includes sequentially outputting section data showing a chronological change in a value for each of the plurality of sections included in the analysis target period. Outputting the analysis result includes analyzing the sequentially output section data for each section, and eliminating, when an analysis of section data for a section included in the analysis target period shows a predefined result, an analysis of section data for one or more sections in the analysis target period that are subsequent to the section for which the analysis shows the predefined result.

A control system according to a third aspect includes a controller that controls a control target, and an input and output device that is connected to the controller and collects data from the control target. The controller includes a control operation unit that cyclically performs a control operation for controlling a control target, a data generator that generates data showing a chronological change in a value associated with the control target, and an analyzer that analyzes the data generated by the data generator and output an analysis result in a predetermined analysis target period. The analysis target period includes a plurality of sections. The generator sequentially outputs section data showing a chronological change in a value for each of the plurality of sections included in the analysis target period. The analyzer analyzes the sequentially output section data for each section. When an analysis of section data for a section included in the analysis target period shows a predefined result, the analyzer eliminates an analysis of section data for one or more sections in the analysis target period that are subsequent to the section for which the analysis shows the predefined result.

A control method implemented by a controller according to a fourth aspect includes cyclically performing a control operation for controlling a control target, generating data showing a chronological change in a value associated with the control target, and analyzing the generated data and outputting an analysis result in a predetermined analysis target period, the analysis target period including a plurality of sections. Generating the data includes sequentially outputting section data showing a chronological change in a value for each of the plurality of sections included in the analysis target period, and outputting the analysis result includes analyzing the sequentially output section data for each section, and eliminating, when an analysis of section data for a section included in the analysis target period shows a predefined result, an analysis of section data for one or more sections in the analysis target period that are subsequent to the section for which the analysis shows the predefined result.

Advantageous Effects

One or more aspects provides a system that can reduce the time taken to output analysis results in an analysis of data collected within a predetermined period of time.

BRIEF DESCRIPTION OF THE DRAWINGS

FIG. 14 is a schematic diagram illustrating output examples of analysis results from an analysis according to one or more embodiments.

DETAILED DESCRIPTION

Figure 1:
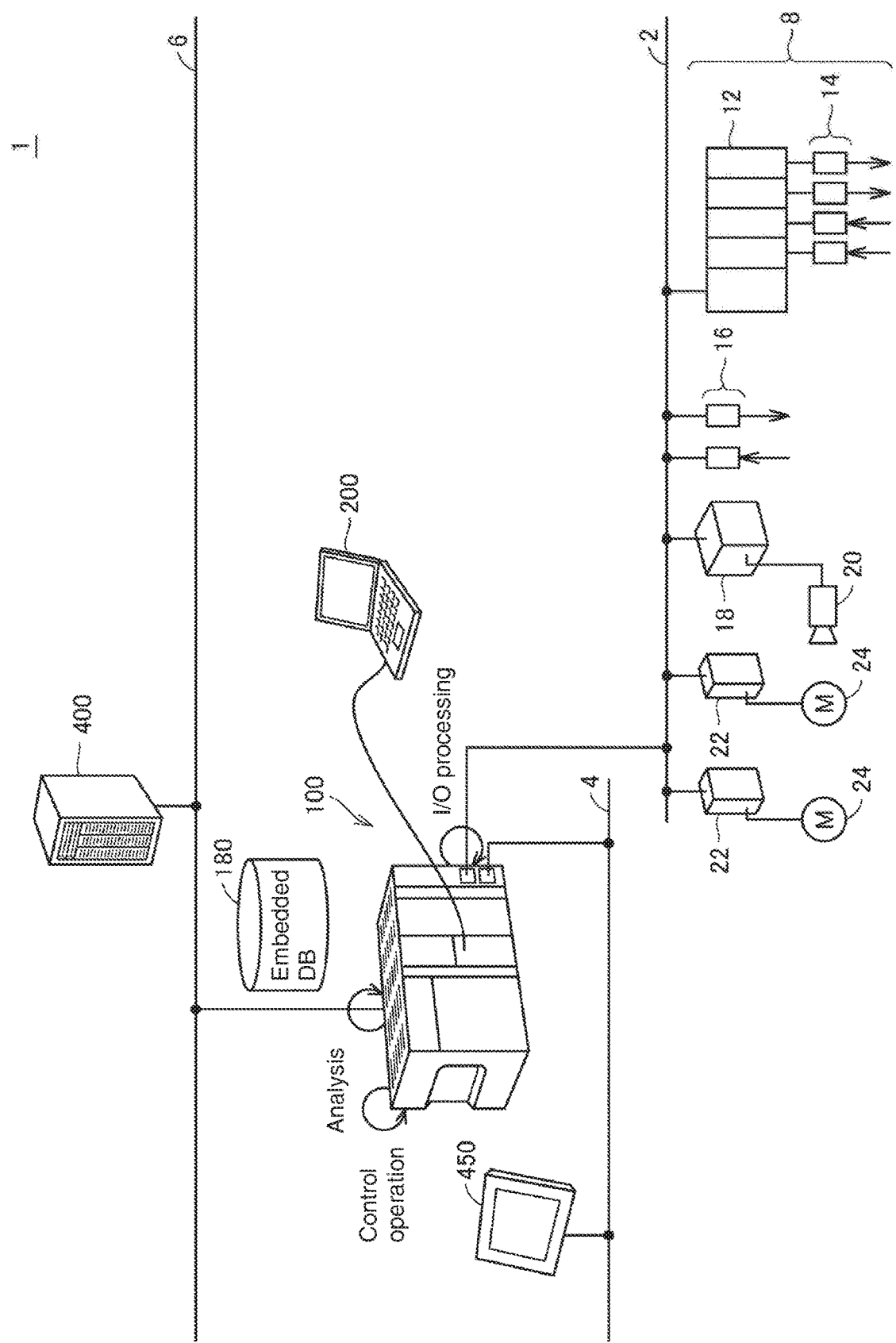
FIG. 1 is a schematic diagram illustrating the overall configuration of a control system according to one or more embodiments.

One or more embodiments will now be described in detail with reference to the drawings. The same or the corresponding components in the figures are given the same reference numerals, and will not be described repeatedly.

A. Overall Configuration of Control System

The overall configuration of a control system 1 including a controller according to one or more embodiments will now be described.

FIG. 1 is a schematic diagram showing the overall configuration of the control system 1 according to one or more embodiments. Referring to FIG. 1, the control system 1 according to one or more embodiments mainly includes a controller 100 for controlling a control target, and a support apparatus 200 connected to the controller 100.

The controller 100 may be a computer, such as a programmable logic controller (PLC). The controller 100 is connected to a field device group 8 with a first fieldbus 2, and to one or more displays 450 with a second fieldbus 4. The controller 100 transmits and receives data to and from each connected device through the corresponding bus or network.

The controller 100 performs control operations for various computations for controlling manufacturing apparatuses and equipment, and performs input and output processing to obtain data measured by the field device group 8 and transferred to the controller 100 (hereafter, input data) or various data items calculated through the control operations, and an analysis for implementing various analyses of data resulting from the input and output processing.

The controller 100 further includes an embedded database 180 storing any data. Although the embedded database 180 is defined in the controller 100 in the typical example described below, the embedded database 180 may be outside the controller 100 (e.g., in a host system such as a database server). The database may be hereafter simply referred to as the DB. The embedded database 180 typically stores various items of data resulting from the input-output processing in chronological order.

The first fieldbus 2 and the second fieldbus 4 may use a bus or a network for such constant cycle communication that enables an on-time arrival of data. The bus or the network and the bus for such constant cycle communication is, for example, EtherCAT (registered trademark), or may be EtherCAT include EtherNet/IP (registered trademark), DeviceNet (registered trademark), or CompoNet (registered trademark).

The field device group 8 is connected to the controller 100. The field device group 8 includes an input and output device that collects data from a control target. The field device group 8 includes devices for collecting input data from a control target or a manufacturing apparatus and a production line associated with control (hereafter collectively referred to as a field). The devices for collecting input data may include an input relay and various sensors (e.g., an analog sensor, a temperature sensor, and a vibration sensor). The field device group 8 also includes devices for acting on the field in a certain manner in response to a command (or output data) generated in the controller 100. The devices for acting on the field may include an output relay, a contactor, a servo driver, a servomotor, and any actuator.

The field device group 8 transmits and receives data including input data and output data to and from the controller 100 through the first fieldbus 2. In the configuration shown in FIG. 1, the field device group 8 includes a remote input-output (I/O) device 12, a relay group 14, an image sensor 18 having a camera 20, and servo drivers 22 each having a servomotor 24. The field device group 8 may not have this structure, and may include any device that collects input data or acts in response to output data.

The remote I/O device 12 includes a communication unit that performs communication through the first fieldbus 2, and an input and output unit (hereafter, I/O unit) that obtains input data and outputs output data. The input data and the output data are transmitted and received between the controller 100 and the field through the I/O unit. In the example shown in FIG. 1, digital signals are transmitted and received as input data and output data through the relay group 14.

The I/O unit may be directly connected to the fieldbus or the field network. In the example shown in FIG. 1, I/O units 16 are directly connected to the first fieldbus 2.

The image sensor 18 performs image measurement, such as pattern matching, using image data captured by the camera 20, and outputs the measurement results to the controller 100.

The servo driver 22 drives the servomotor 24 in accordance with output data (e.g., a position command and a speed command) from the controller 100.

As described above, data is transmitted and received between the controller 100 and the field device group 8 through the first fieldbus 2. The data transmitted and received is updated in very short cycles (system cycles) in the order of several hundreds of microseconds to several tens of milliseconds. Such update of data to be transmitted and received may be referred to as I/O refresh.

The display 450, which is connected to the controller 100 with the second fieldbus 4, receives a user operation and outputs a command in accordance with the user operation to the controller 100, and also graphically displays the operational result obtained in the controller 100.

The support apparatus 200 supports preparations for the controller 100 to control a control target. More specifically, the support apparatus 200 provides a development environment for programs to be executed by the controller 100 (e.g., a program creation and editing tool, a parser, and a compiler), a setting environment for setting parameters (configurations) for the controller 100 as well as various devices connected to the controller 100, and processing to output a created user program to the controller 100, and processing for online correction and modification of a user program to be executed by the controller 100.

FIG. 1 shows the configuration including an external device 400 connected to the controller 100 with an upper network 6. The external device 400 may be a database server, a manufacturing execution system (MES), and a data analysis server.

B. Hardware Configuration of Controller

The hardware configuration of the controller 100 according to one or more embodiments will now be described.

Figure 2:
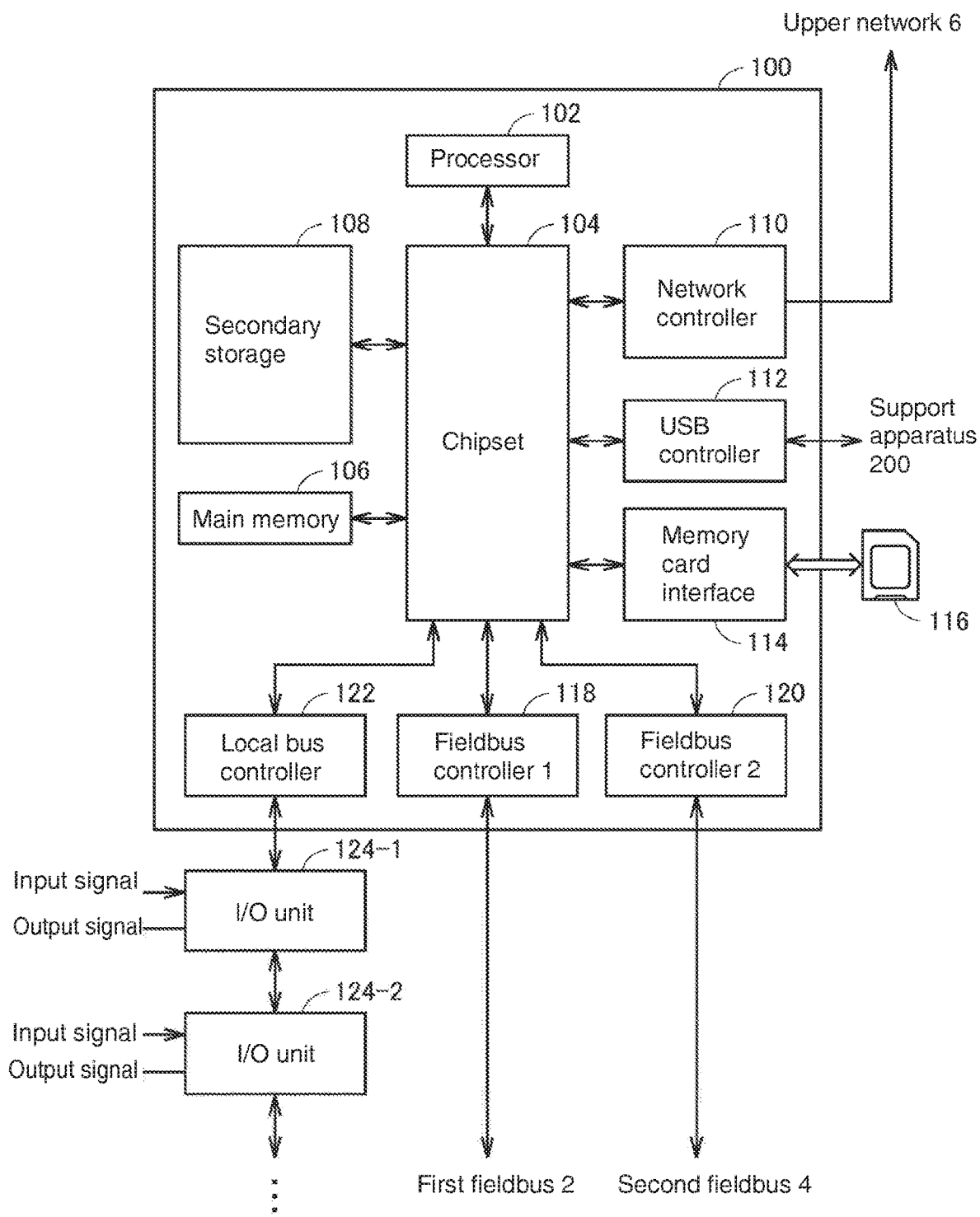
FIG. 2 is a block diagram illustrating the hardware configuration of a controller according to one or more embodiments.

FIG. 2 is a block diagram showing the hardware configuration of the controller 100 according to one or more embodiments. Referring to FIG. 2, the controller 100 includes an operation unit and one or more I/O units 124-1, 124-2, and subsequent I/O units.

The controller 100 includes a processor 102, a chipset 104, a main memory 106, a secondary storage unit 108, a network controller 110, a universal serial bus (USB) controller 112, a memory card interface 114, a local bus controller 122, and fieldbus controllers 118 and 120.

The processor 102 includes a central processing unit (CPU), a micro-processing unit (MPU), or a graphical processing unit (GPU). The processor 102 reads various programs stored in the secondary storage unit 108, and expands the programs in the main memory 106 and executes the programs to achieve control suitable for a control target as well as for various processes described below. The controller may include a plurality of processors 102, or the processor 102 may include a plurality of cores.

The secondary storage unit 108 is, for example, a non-volatile storage device, such as a hard disk drive (HDD) or a solid state drive (SSD). The main memory 106 is, for example, a volatile storage device, such as a dynamic random access memory (DRAM) or a static random access memory (SRAM).

The chipset 104 controls the processor 102 and each unit to enable the overall processing of the controller 100.

The secondary storage unit 108 stores system programs for implementing basic operations and user programs created in accordance with control targets, such as a manufacturing apparatus or a piece of equipment. Further, the secondary storage unit 108 provides a storage area to achieve the embedded database 180.

The network controller 110 transmits and receives data to and from the external device 400 (refer to FIG. 1) through the upper network 6. The network controller 110 is typically implemented using a dedicated circuit such as an application specific integrated circuit (ASIC) or a field programmable gate array (FPGA).

The USB controller 112 controls data transmitted to and received from the support apparatus 200 with a universal serial bus (USB) connection. The USB controller 112 is typically implemented using a dedicated circuit such as an ASIC or an FPGA.

The memory card interface 114 can receive a removable memory card 116, to which data can be written and from which various items of data (e.g., a user program and trace data) can be read.

The local bus controller 122 is an interface that transmits and receives data to and from the I/O units 124-1, 124-2, and subsequent I/O units mounted on the controller 100.

The fieldbus controller 118 controls data transmission and reception to and from other devices through the first fieldbus 2. The fieldbus controller 118 is typically implemented using a dedicated circuit such as an ASIC or an FPGA, but may be implemented with software. In software implementations, the fieldbus controller 118 mainly includes a processor, a main memory, and a storage. The processor reads system programs (firmware) from the storage, and expands the programs in the main memory and executes the programs to implement intended processing.

Similarly, the fieldbus controller 120 transmits and receives data to and from other devices through the second fieldbus 4. The fieldbus controller 120 is typically implemented using a dedicated circuit such as an ASIC or an FPGA, but may be implemented with software. In software implementations, the fieldbus controller 120 mainly includes a processor, a main memory, and a storage. The processor reads system programs (firmware) from the storage, and expands the programs in the main memory and executes the programs to implement intended processing.

Although FIG. 2 shows the configuration in which the processor 102 executes programs to provide intended processes, some or all of the provided processes may also be implemented using dedicated hardware circuits (e.g., ASICs or FPGAs). The main part of the controller 100 may be implemented using hardware with a general-purpose architecture (e.g., an industrial personal computer based on a general-purpose personal computer). In that case, multiple operating systems (OSes) for different uses may run in parallel using a virtualization technique, and an intended application may be executed on each OS.

C. Processing Based on Priorities

The processing performed based on a priority defined in the controller 100 will now be described.

Figure 3:
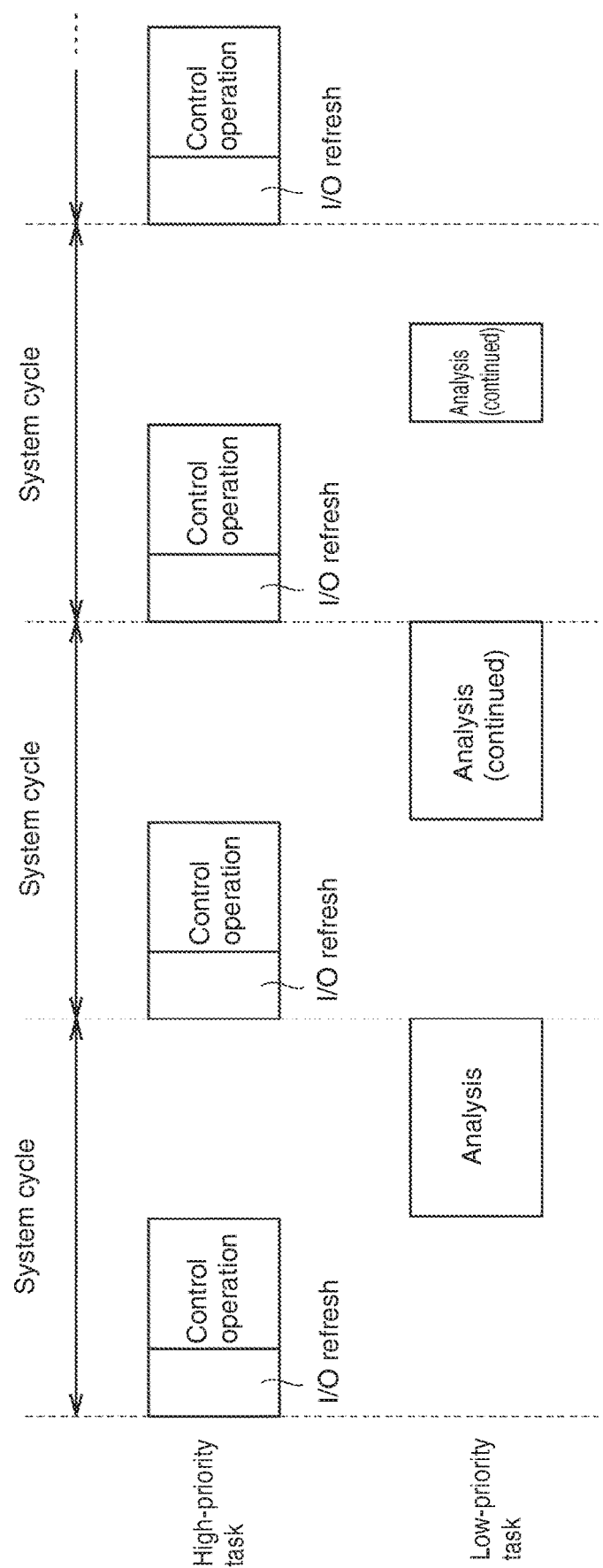
FIG. 3 is a diagram illustrating processing performed in accordance with a priority defined in a controller according to one or more embodiments.

FIG. 3 is a diagram describing the processing performed based on a priority defined in the controller 100 according to one or more embodiments. Referring to FIG. 3, the controller 100 performs control operations in every system cycle. The control operations include sequence operations for performing processing in accordance with various conditions, and motion operations for driving a servo driver or a servomotor. Such control operations are typically performed by the processor 102 in the controller 100 reading a user program from the secondary storage unit 108, and expanding the program in the main memory 106 and executing the program. More specifically, the processor 102 in the controller 100 uses a user program to implement a control operation process for cyclically performing control operations for controlling a control target.

In one example, two tasks (e.g., a high-priority task and a low-priority task) are defined with different priorities. The high-priority task may be processing to be performed in every system cycle (e.g., I/O refresh and control operations). The low-priority task may be processing that may be performed across multiple system cycles, or processing that may be performed without precise execution timing (e.g., analysis).

In every cycle, as shown in FIG. 3, when the I/O refresh and the control operations, which are set as high-priority tasks, are complete, the analysis, which is set as a low-priority task, is performed. A low-priority task is performed in a period in which a high-priority task is not executed in each system cycle. Thus, the processing set as a low-priority task may be incomplete in one system cycle. In the example shown in FIG. 3, the analysis is performed across three system cycles. When the controller 100 includes a plurality of processors 102 or the processor 102 in the controller 100 includes a plurality of cores, each task may be executed in a divided manner.

D. Overview of Analysis

The overview of the analysis performed by the controller 100 according to one or more embodiments will now be described. The processor 102 in the controller 100 typically reads a system program and/or a user program from the secondary storage unit 108, and expands the program in the main memory 106 and executes the program. As a result, the controller 100 functions as an analyzer that performs an analysis. In the example described below, the analysis is to determine whether a control target for which analysis-target data is collected has an abnormality based on the collected data (hereafter also referred to as abnormality determination). However, the analysis according to one or more embodiments may be any other process.

The analysis according to one or more embodiments outputs an analysis result in every analysis target period. When, for example, the analysis is the abnormality determination, the analysis target period corresponds to the cycle for determining an abnormality. The analysis target period is hereafter also referred to as an abnormality monitoring period.

Figure 4:
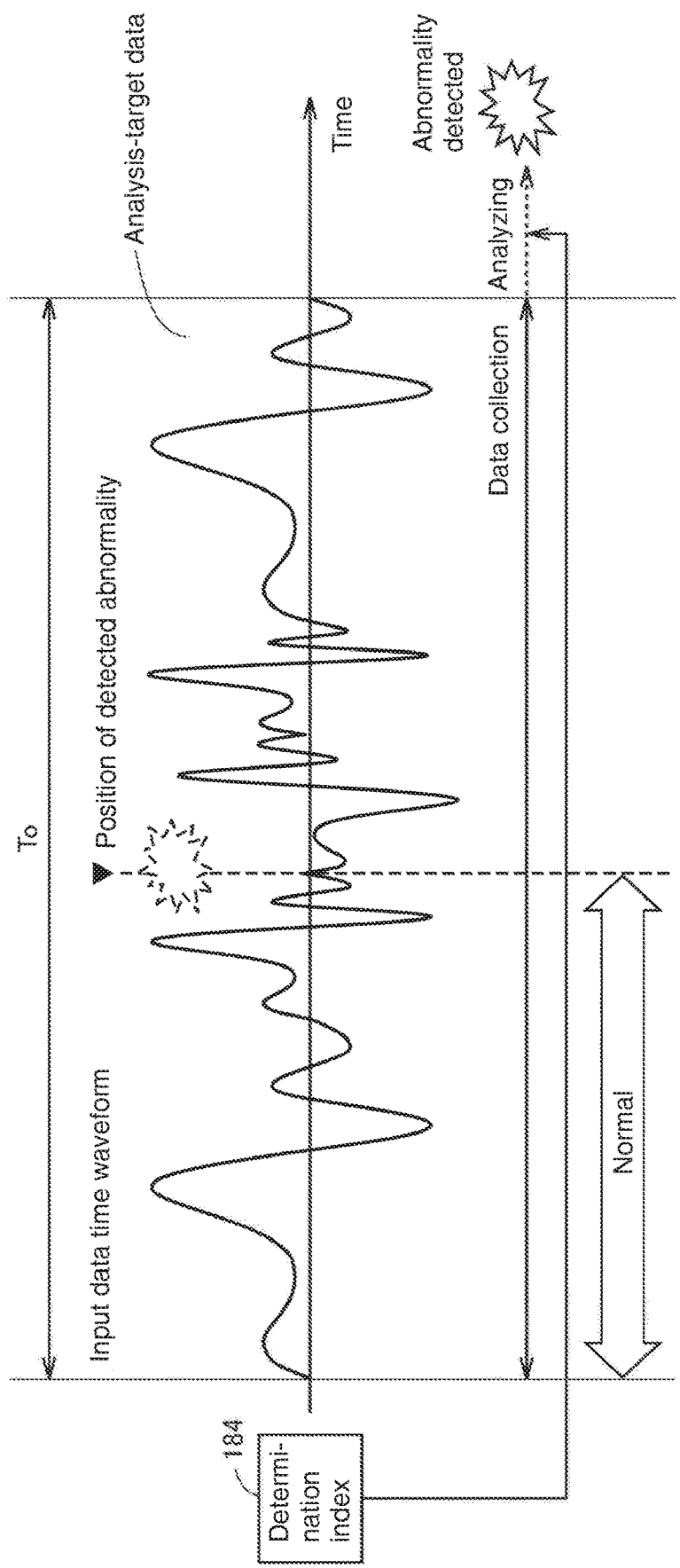
FIG. 4 is a diagram illustrating an analysis with a relevant technique.

The analysis with a relevant technique will be described. FIG. 4 is a diagram describing an analysis with the relevant technique. FIG. 4 shows an example analysis that is determination as to whether a control target has an abnormality based on input data identifying a control target or indicating the state of the control target (abnormality determination).

Although the input data undergoes the analysis in the example described below, data to undergo the analysis may be output data transmitted to the field, and also operation data calculated through a control operation, in addition to the input data collected from the field. Although one set of input data is used in this example for ease of explanation, multiple sets of input data may be collected at a time.

More specifically, as shown in FIG. 4, the controller 100 collects chronological changes in input data appearing in an abnormality monitoring period To, and evaluates the collected input data (a set of input values arranged chronologically) using a determination index 184 prepared in advance to determine whether an abnormality has occurred in the control target associated with the input data. Target data to undergo analysis, or data representing the chronological changes in the input data occurring in the abnormality monitoring period To shown in FIG. 4 is hereafter also referred to as analysis-target data.

The analysis-target data herein refers to data representing chronological changes in values associated with a control target. The analysis-target data may typically be a time waveform representing the target values, or any feature quantity calculated from the time waveform. The analysis-target data may further include multiple values associated with the control target (e.g., a set of a command value and an actual value), or data representing a result from a predetermined operation using multiple values associated with the control target (e.g., a difference between a command value and an actual value). As described above, the analysis-target data herein may include a predetermined value obtained either directly or indirectly from the control target.

The length of the abnormality monitoring period To may be determined based on a tact time taken by a monitoring target, such as a manufacturing apparatus or a piece of equipment (e.g., the time length that can be assigned to processing for one workpiece).

The determination index 184 includes an evaluation criterion (normal data) used to determine whether an abnormality has occurred. The determination index 184 is compared with analysis-target data or a feature quantity calculated from the analysis-target data to calculate a numerical value indicating the presence or absence of an abnormality, or a numerical value indicating the likelihood of an abnormality. In the example shown in FIG. 4, the determination index 184 corresponding to the length of the abnormality monitoring period To is prepared.

In the abnormality determination shown in FIG. 4, analysis-target data is to be generated by collecting data throughout the abnormality monitoring period. More specifically, the analysis is performed after all the values within the abnormality monitoring period To are collected. This causes a delay in detecting an abnormality.

Figure 5:
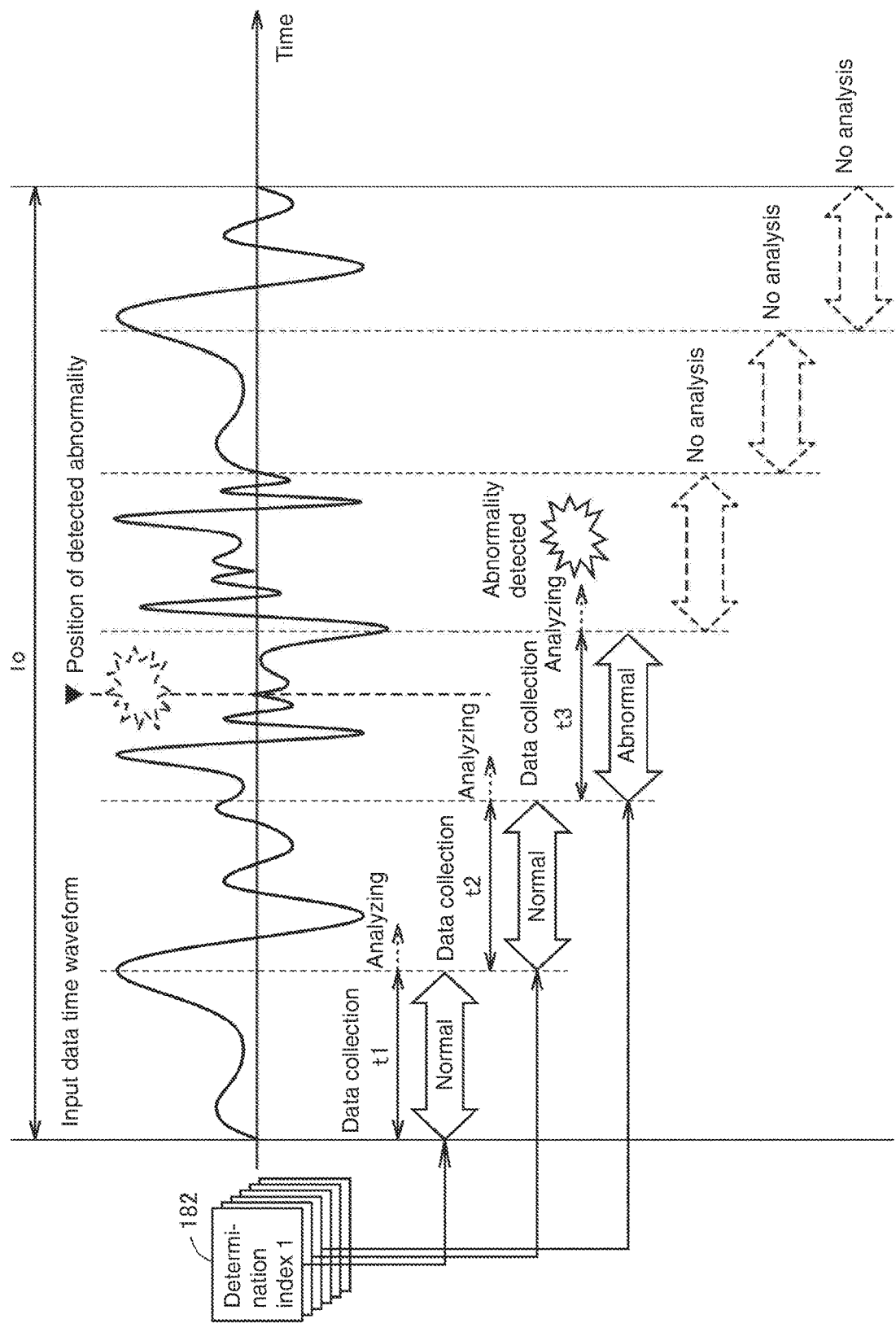
FIG. 5 is a diagram illustrating an analysis according to one or more embodiments.
Figure 6:
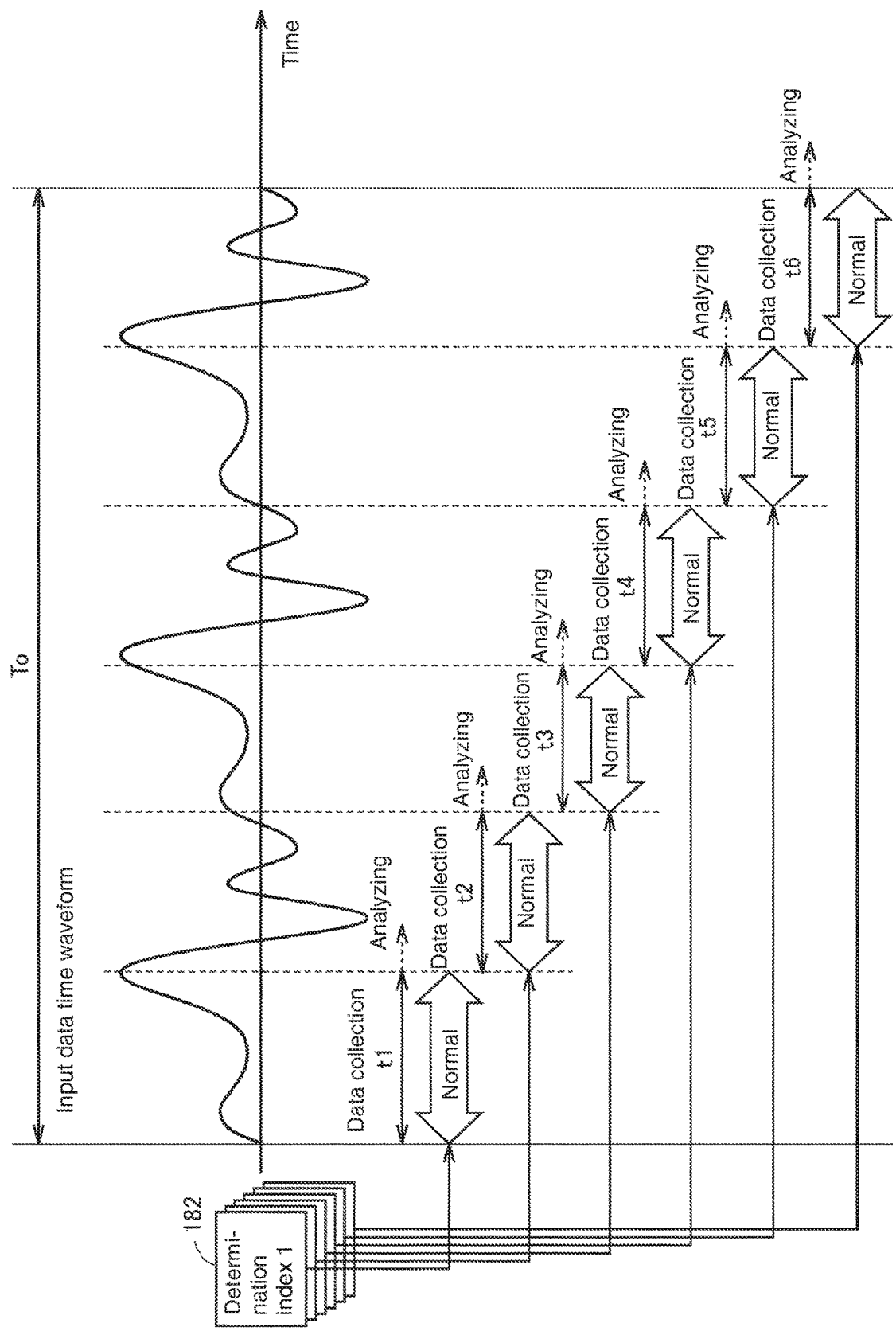
FIG. 6 is a diagram illustrating an analysis according to one or more embodiments.

The analysis according to one or more embodiments will now be described. FIGS. 5 and 6 are diagrams describing the analysis according one or more embodiments. In the example shown in FIG. 5, an abnormality occurs during the abnormality monitoring period To. In the example shown in FIG. 6, no abnormality occurs during the abnormality monitoring period To.

Referring to FIG. 5 and FIG. 6, the predetermined abnormality monitoring period To is divided into a plurality of sections, in each of which the collected analysis-target data undergoes determination in the analysis according to one or more embodiments.

To perform such stepwise determination, a hierarchal determination index group 182 is used instead of the determination index 184 shown in FIG. 4. The determination index group 182 may be determined based on each model created for a different section to be analyzed (a time duration and a time range). The determination index group 182 may include normal data to be used for the stepwise analysis, or may include one or more thresholds defined for each section. For example, the determination index group 182 includes one or more indexes corresponding to the number of sections included in the abnormality monitoring period To. For example, when the abnormality monitoring period To is divided into six sections t1 to t6, determination indexes 1 to 6 may be defined for these sections. A common determination index may be used for a plurality of sections. The determination indexes 1 to 6 are hereafter defined for the corresponding sections t1 to t6 for ease of explanation.

As shown in FIG. 5, in the data generation performed in the controller 100 (typically performed by the processor 102 executing a predetermined user program), section data indicating chronological changes in values in each section is output sequentially for each section defined in the abnormality monitoring period To.

More specifically, the controller 100 first collects input data for the section t1 in the abnormality monitoring period To, and generates section data for the analysis-target data and determines whether an abnormality has occurred in the generated section data using the determination index 1. In this example, no abnormality has occurred, and the data is determined normal. Subsequently, the controller 100 collects input data for the section t2 in the abnormality monitoring period To, and generates section data for analysis-target data to determine the presence or absence of an abnormality included in the section data generated using the determination index 2. In this example, no abnormality has occurred, and the data is determined normal.

Further, the controller 100 collects input data for the section t3 in the abnormality monitoring period To, and generates section data for analysis-target data to determine the presence or absence of an abnormality included in the section data generated using the determination index 3. In this example, an abnormality has occurred in the section t3, and an analysis result indicates the abnormality. In other words, an abnormality can be detected at a midpoint during the process before collecting input data for all the sections included in the abnormality monitoring period To.

After any abnormality is detected, no analysis is to be continued further in the identical abnormality monitoring period To. In other words, in the example shown in FIG. 5, an abnormality is detected immediately after the section t3, and thus no analysis is performed in the sections t4 to t6 subsequent to the section t3. Input data may be collected in the section t4.

In the analysis according to one or more embodiments, as described above, an analysis result from a preceding section is used to determine whether to perform an analysis in subsequent sections. More specifically, the controller 100 analyzes section data obtained from each section that is output sequentially. When the analysis of section data obtained from any of these sections shows a predefined result (an abnormality in this example), no analysis is performed for section data for subsequent sections included in the target abnormality monitoring period To (analysis target period).

When an abnormality is detected in the preceding section as shown in FIG. 5, no analysis is performed in the subsequent sections. Eliminating unneeded analysis in this manner reduces the amount of operations.

Any abnormality in each section can be detected without collecting input data across all the sections included in the abnormality monitoring period To, and thus the abnormality can be detected more promptly.

When no abnormality is detected during the abnormality monitoring period To, an analysis is performed for section data collected in each of the sections t1 to t6 included in the abnormality monitoring period To. In this case as well, the analysis can be faster than the analysis performed with the relevant technique shown in FIG. 4. The analysis is faster because data collection in one section and an analysis of section data collected in a preceding section can be performed in parallel. For example, an analysis of section data collected in the section t1 can be performed in unoccupied time during data collection in the section t2. As described above, data collection and analysis can be performed for each section defined in the abnormality monitoring period To. This analysis thus takes less time before outputting a final analysis result (indicating the presence or absence of an abnormality) than the analysis with the relevant technique shown in FIG. 4.

As described above, the abnormality monitoring period To divided into sections allows an analysis of section data collected in a preceding section to be performed while no processing is performed during data collection in subsequent section when no abnormality is detected. This allows an early analysis, and shortens the time taken to output a final analysis result.

E. Software Configuration of Controller

The software configuration of the controller 100 according to one or more embodiments will now be described.

Figure 7:
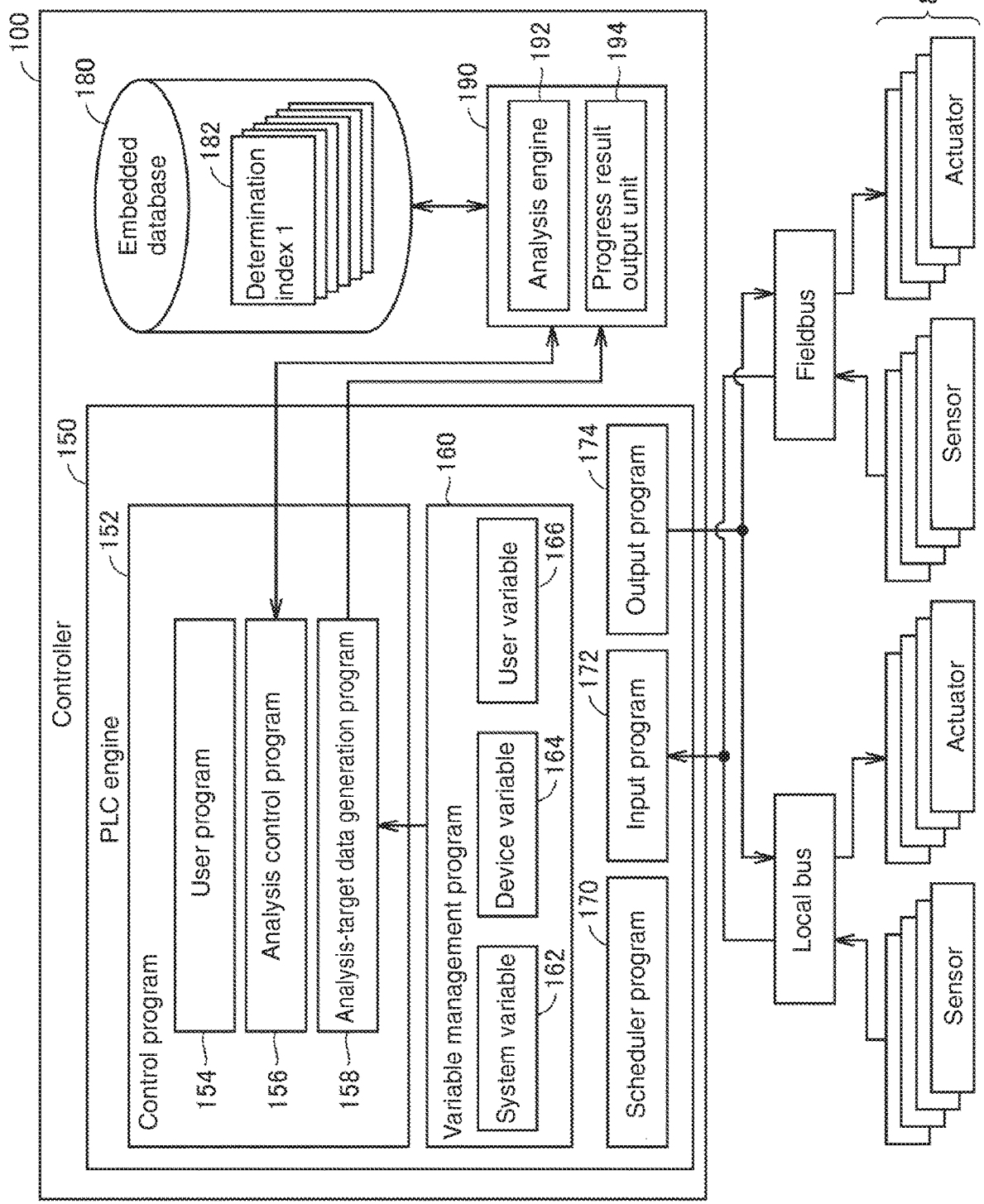
FIG. 7 is a block diagram illustrating the software configuration of a controller according to one or more embodiments.

FIG. 7 is a block diagram showing the software configuration of the controller 100 according to one or more embodiments. As shown in FIG. 7, the controller 100 includes a PLC engine 150, the embedded database 180, and an analyzer 190.

The PLC engine 150 is typically provided with an environment for executing various programs with the processor 102 in the controller 100 reading a system program stored in the secondary storage unit 108, and expanding the program in the main memory 106 and executing the program. The PLC engine 150 executes various programs in this execution environment.

More specifically, the PLC engine 150 includes a control program 152, a variable management program 160, a scheduler program 170, an input program 172, and an output program 174. The variable management program 160, the scheduler program 170, the input program 172, and the output program 174 may be implemented using some of the system programs. In this case, a single system program may also achieve the processes provided by these programs.

The control program 152 typically includes a user program 154, an analysis control program 156, and an analysis-target data generation program 158.

The user program 154 mainly corresponds to the control operation process, and may be freely defined in accordance with a control target of the controller 100, such as a manufacturing apparatus or a piece of equipment. The user program 154 may be defined by, for example, ladder logic using function blocks.

The analysis control program 156 controls execution of an analysis performed by the analyzer 190. The program includes monitoring and controlling the progress of an analysis of analysis-target data based on, for example, partial analysis results obtained from the analyzer 190. More specifically, the analysis control program 156 consecutively monitors the progress of the analysis performed by the analyzer 190. The program further includes interrupting the analysis based on an analysis result output during the process. In this manner, the analysis control program 156 can instruct the analyzer 190 to report the progress of the analysis and also to provide an analysis result obtained at a midpoint during the analysis.

The analysis-target data generation program 158 generates analysis-target data, which is to be transmitted to the analyzer 190. The analysis-target data herein shows chronological changes in values associated with a control target. More specifically, the analysis-target data generation program 158 generates data including a predetermined number of values representing both input data collected by, for example, the field device group 8 and data stored in the embedded database 180. As described above, the processor 102 in the controller 100 and the analysis-target data generation program 158 implement a data generator, which generates data showing chronological changes in values associated with a control target.

The variable management program 160 manages values usable in the PLC engine 150 as variables. More specifically, the variable management program 160 manages system variables 162 showing, for example, the status of the controller 100, device variables 164 showing the values held by each device connected to the controller 100 with a local bus or a fieldbus, and user variables 166 showing the value held by the user program 154 executed in the controller 100.

The scheduler program 170 manages resource allocation and execution timings of processes and tasks performed by the controller 100.

The input program 172 provides processing for obtaining input data from each device connected to the controller 100 with a local bus or a fieldbus.

The output program 174 outputs command values (output data), which are calculated by the user program 154 executed in the controller 100, to target devices connected to the controller 100 with a local bus or a fieldbus.

The embedded database 180 is typically mounted in the main memory 106 or the secondary storage unit 108 (refer to FIG. 2), and stores data, as well as searches for specified data in response to an input request (query).

The embedded database 180 includes the determination index group 182 used for the analysis described above. In other words, the embedded database 180 is a storage unit storing each determination index used for analyzing section data for a plurality of sections included in the abnormality monitoring period To.

Further, the embedded database 180 may store at least part of input data, output data, operation data calculated through a control operation performed by the control program 152, and manufacture data in chronological order.

The analyzer 190, which performs the analysis provided by the controller 100 according to one or more embodiments, includes an analysis engine 192 and a progress result output unit 194. The analyzer 190 is typically implemented by the processor 102 in the controller 100 reading a system program and/or a user program stored in the secondary storage unit 108, and expanding the system program and/or the user program in the main memory 106 and executing the program.

The analysis engine 192 determines the presence or absence, or the likelihood of an abnormality by comparing the determination index group 182, which is included in the embedded database 180, with analysis-target data. The progress result output unit 194 outputs information about the progress and stages of determination using the analysis-target data performed by the analysis engine 192.

In the controller 100 according to one or more embodiments, the processor 102 and the analysis control program 156 performs an analysis of analysis-target data, which is generated by executing the analysis-target data generation program 158, and provides an analysis that outputs analysis results for every predetermined analysis target period.

F. Procedure

A procedure for the analysis according to one or more embodiments will now be described.

Figure 8:
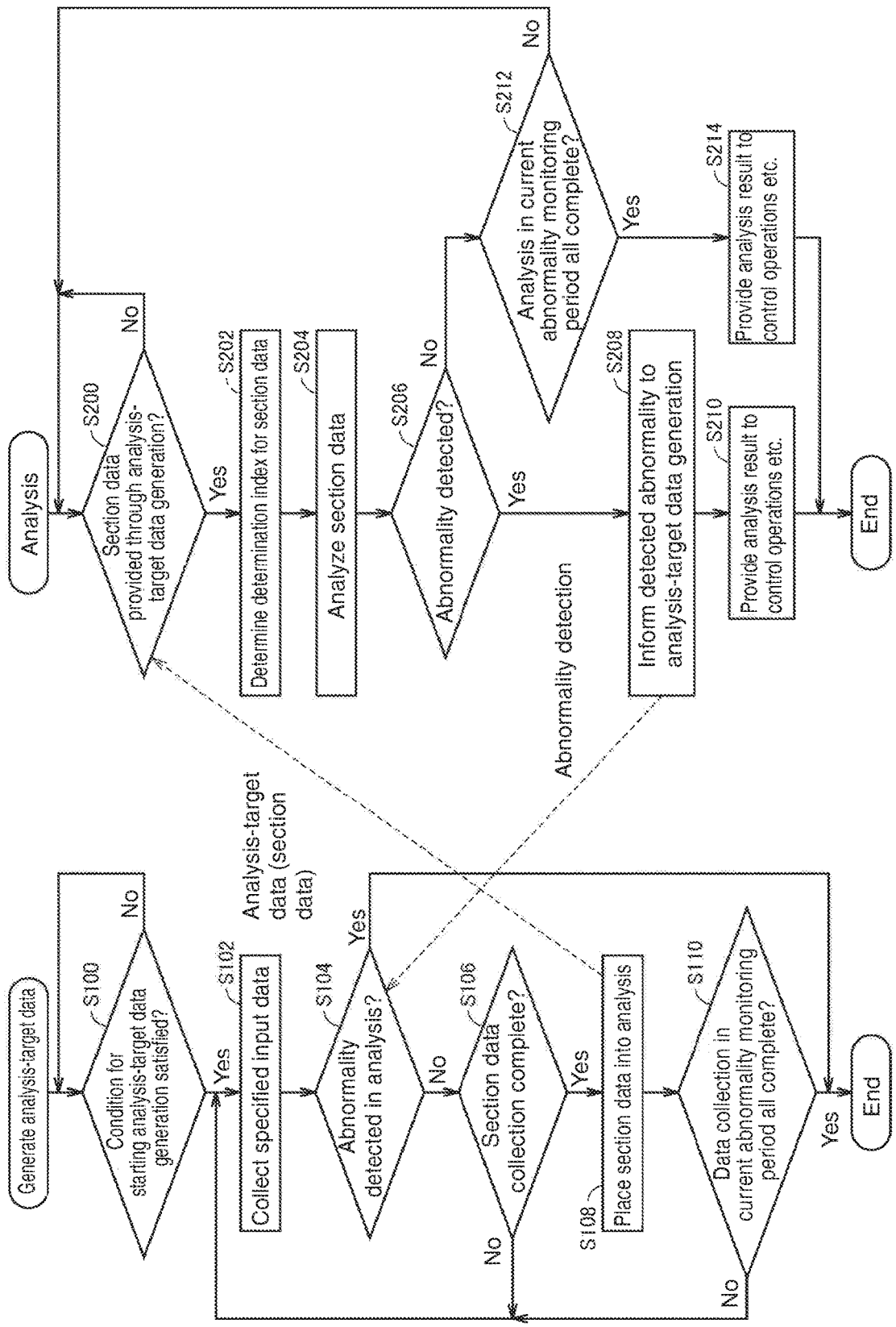
FIG. 8 is a flowchart illustrating the processing order of an analysis according to one or more embodiments.

FIG. 8 is a flowchart showing the procedure for the analysis according to one or more embodiments. As shown in FIG. 8, the analysis according to one or more embodiments includes generation of analysis-target data (implemented by the processor 102 executing the analysis-target data generation program 158 shown in FIG. 7) in parallel with an analysis of the analysis-target data (implemented by the processor 102 executing the analysis control program 156).

The generation of analysis-target data may be entered as a high-priority task as shown in FIG. 3, and the analysis of analysis-target data may be entered as a low-priority task as shown in FIG. 3. No data loss is acceptable in collecting the analysis-target data. The generation of analysis-target data may thus be performed in the same cycles as the control operations or the I/O refresh. In contrast, the analysis-target data generation is to be simply complete within a predetermined period of time, and may be less real-time than the generation of analysis-target data.

As described above, the controller 100 according to one or more embodiments can control task execution to perform control operations and generation of analysis-target data with a higher priority than an analysis of analysis-target data. Such execution control is typically implemented by the processor 102 executing the scheduler program 170 (FIG. 7).

For generating analysis-target data as shown in FIG. 8, the processor 102 in the controller 100 determines whether the condition for starting analysis-target data generation is satisfied (step S100). The condition for starting analysis-target data generation may be, for example, entering a predetermined abnormality monitoring period or receiving a trigger signal generated when the user program 154 is executed.

When determining that the condition for starting analysis-target data generation is unsatisfied (No in step S100), the processor 102 repeats the processing in step S100.

When determining that the condition for starting analysis-target data generation is satisfied (Yes in step S100), the processor 102 collects specified input data in predetermined sampling cycles (step S102).

While collecting the specified input data, the processor 102 determines whether an abnormality has been detected through the analysis (step S104). More specifically, the processor 102 determines whether an abnormality has been detected in the analysis-target data (section data) collected in a preceding section.

When an abnormality has been detected through the analysis (Yes in step S102), the processor 102 ends the analysis-target data generation in the current abnormality monitoring period.

When no abnormality has been detected through the analysis (No in step S102), the processor 102 determines whether the data collection in the current section is complete (step S106).

When determining that the data collection in the current section is incomplete (No in step S106), the processor 102 repeats the processing in step S102 and subsequent steps.

When determining that the data collection in the current section is complete (Yes in step S106), the processor 102 passes the collected analysis-target data (section data) for use in an analysis (step S108). The processor 102 then determines whether all the data collection in the current abnormality monitoring period is complete (step S110).

When all the data collection in the current abnormality monitoring period is incomplete (No in step S110), the processor 102 repeats the processing in step S102 and subsequent steps.

When all the data collection in the current abnormality monitoring period is complete (Yes in step S110), the processor 102 ends the analysis-target data generation in the current abnormality monitoring period.

In analyzing the analysis-target data, the processor 102 in the controller 100 determines whether analysis-target data (section data) has been generated through the analysis-target data generation (step S200). When the analysis-target data (section data) has yet to be generated through the analysis-target data generation (No in step S200), the processor 102 repeats the processing in step S200.

When the analysis-target data (section data) has been generated through the analysis-target data generation (Yes in step S200), the processor 102 determines a determination index corresponding to the analysis-target data (section data) generated through the analysis-target data generation (step S202), and performs an analysis (determination) of the targeted analysis-target data (section data) using the obtained determination index (step S204). The processor 102 then determines whether an abnormality has been detected through the analysis (determination) in step S204 (step S206).

When an abnormality is detected (Yes in step S206), the processor 102 informs the analysis-target data generation of the presence of the abnormality (step S208). The processor 102 then informs, for example, the control operations (provided by executing the user program 154) of the details of the abnormality detection and the analysis result including, for example, information indicating the section in which the abnormality is detected (step S210), and ends the analysis in the current abnormality monitoring period.

In contrast, when no abnormality is detected (No in step S206), the processor 102 determines whether all the analysis complete in the current abnormality monitoring period (step S212).

When all the analysis is incomplete in the current abnormality monitoring period (No in step S212), the processor 102 repeats the processing in step S200 and subsequent steps.

When all the analysis is complete in the current abnormality monitoring period (Yes in step S212), the processor 102 informs, for example, the control operations (provided by executing the user program 154) of the absence of any abnormality during the target abnormality monitoring period and the analysis result including, for example, the time taken for the analysis (step S214), and ends the analysis in the current abnormality monitoring period.

G. Analysis and Determination Index Group

The analysis according to one or more embodiments will now be described in detail. As described above, the analysis according to one or more embodiments determines the presence or absence of an abnormality, or the likelihood of an abnormality for section data collected in each section, which is part of analysis-target data. The behavior of the analysis-target data is to be evaluated based on the determination for section data in each section.

Thus, the analysis according to one or more embodiments uses the analysis results obtained from section data collected in each section in an analysis of subsequent section data. More specifically, using the analysis result for section data in a preceding section (hereafter also referred to as an intermediate analysis result) in an analysis of section data collected in each section enables evaluation of the behavior of the entire analysis-target data, which is an integration of section data for a plurality of sections.

Figure 9:
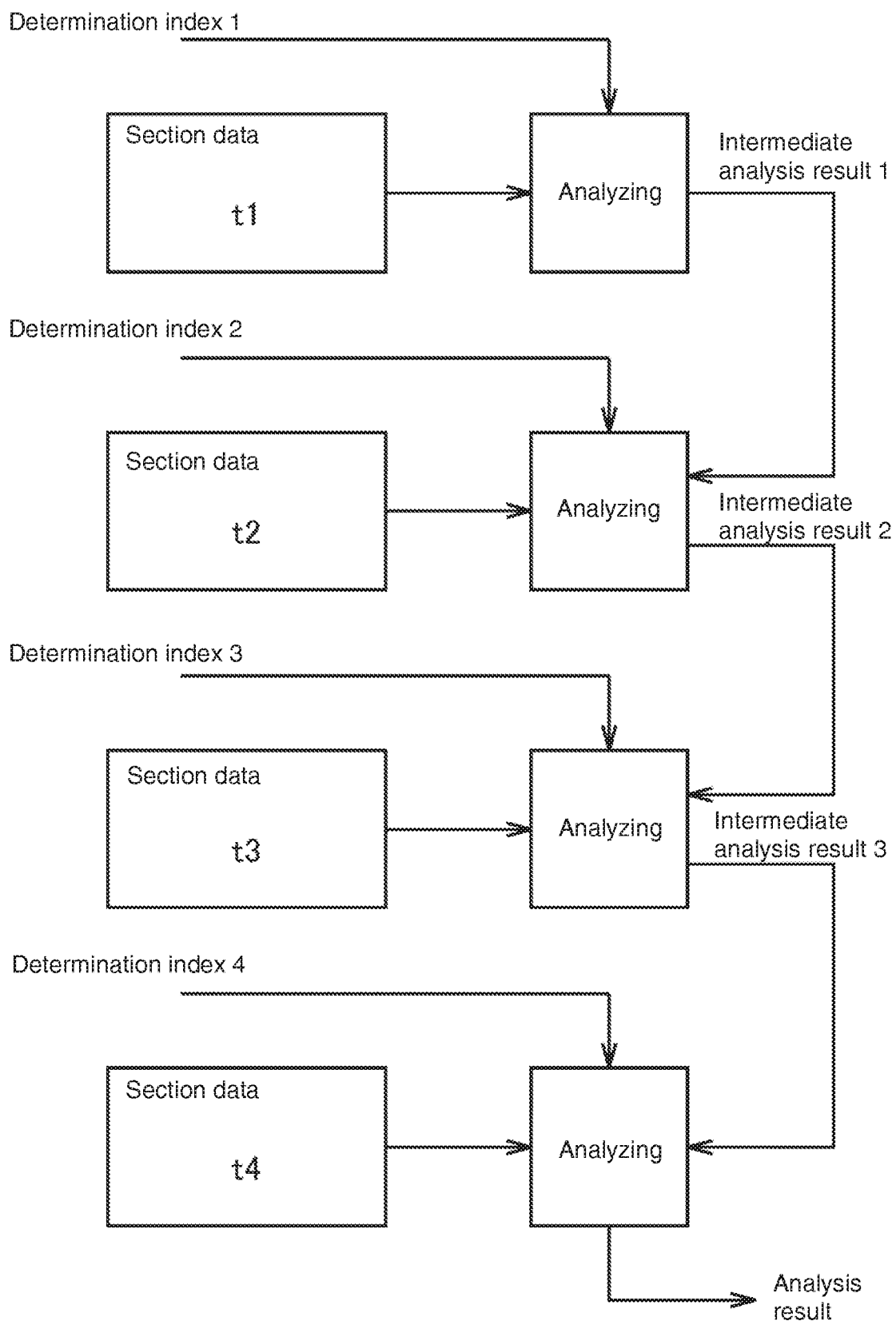
FIG. 9 is a diagram illustrating feedback of analysis results obtained from section data in an analysis according to one or more embodiments.

FIG. 9 is a flowchart describing feedback of analysis results obtained from section data in the analysis according to one or more embodiments. In one example, FIG. 9 shows an abnormality monitoring period including four sections (sections t1 to t4).

As shown in FIG. 9, data for the section t1, which is collected in the first section, is analyzed using the corresponding determination index 1. This analysis outputs an analysis result (intermediate analysis result 1).

Data for the section t2, which is collected in the second section, is analyzed using the corresponding determination index 2 as well as the intermediate analysis result 1 obtained from the data for the preceding section t1. This analysis outputs an analysis result (intermediate analysis result 2).

Similarly, data for the section t3, which is collected in the third section, is analyzed using the corresponding determination index 3 as well as the intermediate analysis result 2 obtained from the data for the preceding section t2. This analysis outputs an analysis result (intermediate analysis result 3).

Finally, data for the section t4, which is collected in the last section, is analyzed using the corresponding determination index 4 as well as the intermediate analysis result 3 obtained from the data for the preceding section t3. This analysis outputs the final analysis result.

As described above, an analysis of data for each section uses an analysis result (intermediate analysis result) from data for a preceding section. This enables evaluation of the behavior of the entire analysis-target data, which is an integration of section data for a plurality of sections. In other words, the controller 100 (analyzer) uses analysis results obtained from section data for preceding sections included in the abnormality monitoring period To (analysis target period) to analyze section data for subsequent sections included in the abnormality monitoring period To.

Figure 10:
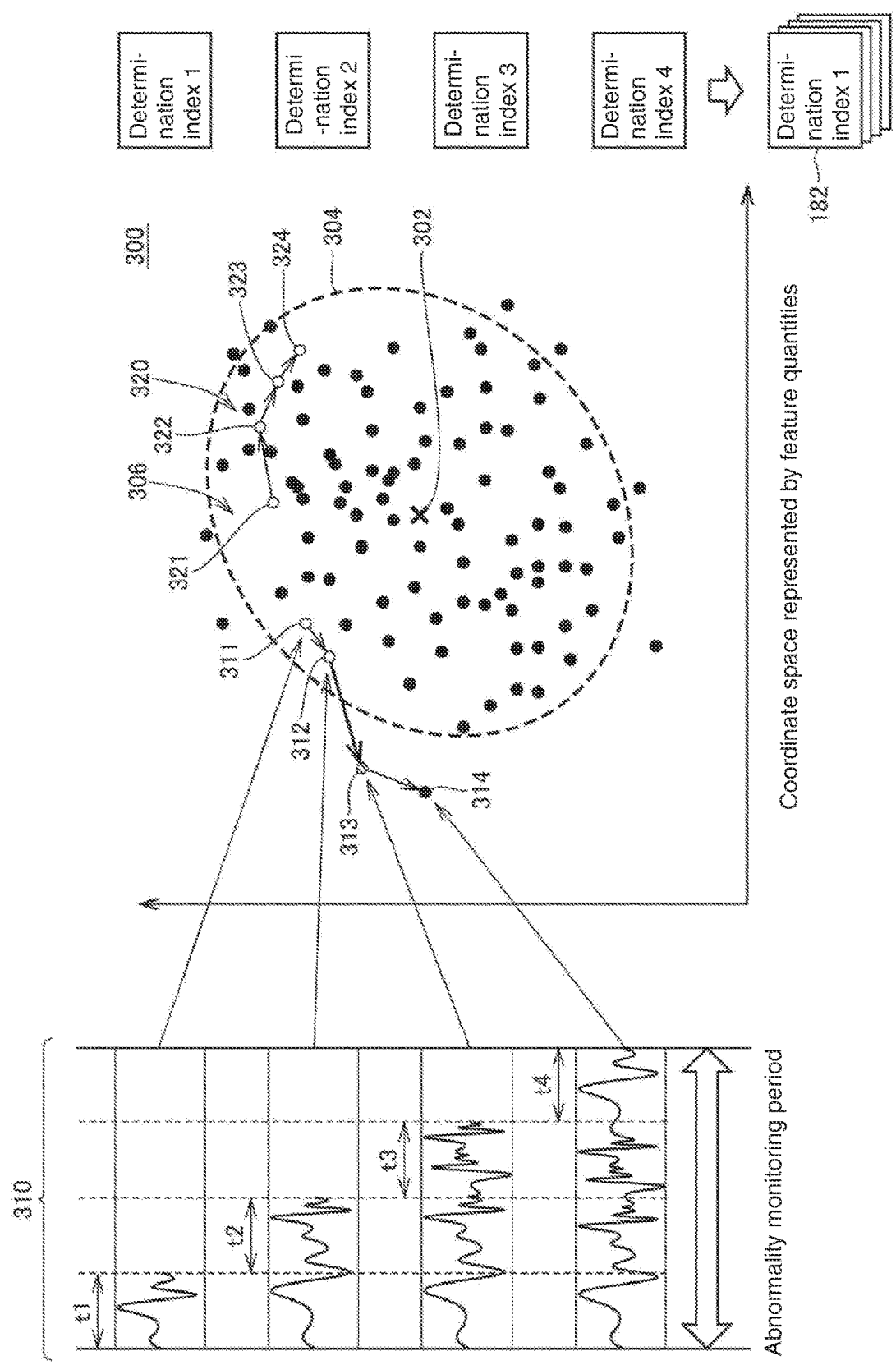
FIG. 10 is a diagram illustrating an example method for determining a determination index group used in an analysis according to one or more embodiments.

The determination indexes used for such stepwise analyses as described above will now be described. FIG. 10 is a diagram describing an example determination method for determining a determination index group used in the analysis according to one or more embodiments.

FIG. 10 shows an example feature quantity space 300 expressed using sampled feature quantities, which are calculated from analysis-target data (typically a feature quantity vector including a plurality of feature quantities), plotted at their corresponding points in a coordinate space.

Each feature quantity usually includes a label (normal or abnormal). A user refers to the label assigned to each feature quantity to determine a threshold range 304 defining a group of feature quantities in a normal state and/or a group of feature quantities in an abnormal state. For example, the user may specify the predetermined threshold range 304 by specifying a reference position 302, which represents an average position for N samples in the normal state, and using the reference position 302 as a reference. A sample group 306 included in the threshold range 304 corresponds to a group of samples in the normal state or a group of samples in the abnormal state (in other words, normal data or abnormal data).

In the example shown in FIG. 10, the position and the scope of the threshold range 304 correspond to the thresholds specified by a user.

Analysis-target data 310 shown in FIG. 10 will be taken as an example. For example, when the abnormality monitoring period during which the analysis-target data 310 is collected includes four sections (sections t1 to t4), the feature quantity calculated from data for the section t1, which is collected in the first section, is located at coordinates 311 in the feature quantity space 300. In this case, the coordinates 311 fall within the normal range. The feature quantity calculated from data for the section t2, which is collected in the subsequent second section, shifts to coordinates 312 in the feature quantity space 300. In this state, the coordinates 312, still falling within the normal range, have shifted toward the abnormal range. The feature quantity calculated from data for the section t3, which is collected in the subsequent third section, shifts to coordinates 313 in the feature quantity space 300. In this state, the coordinates 313 fall outside the normal range, and are thus determined abnormal. In other words, the data for the corresponding section t3 includes abnormal data, and the coordinates 313 have shifted beyond the normal range toward the abnormal range.

The feature quantity calculated from data for the section t4, which is collected in the last section, finally reaches coordinates 314 in the feature quantity space 300. In this state, the coordinates 314 are outside the normal range, and are determined outside the normal range through an analysis of all values within the range of the abnormality monitoring period. In this case, an abnormality is detected.

The determination index group 182 used for such an analysis can be determined based on the behavior of each sample in the feature quantity space 300. In other words, each determination index in a determination index group serves as a criterion to determine whether adding an analysis result obtained from data for each section causes either a shift toward the normal range or a shift toward the abnormal range in the feature quantity space 300, which is used for evaluation through the analysis.

For this determination criterion, the determination index that is a threshold for each section may be determined by obtaining the behavior (the shift pattern or the shift quantity) of the feature quantities of each sample included in a sample group in the normal state, and statistically processing the behavior of the feature quantities of each sample.

For example, a normal sample 320 in the feature quantity space 300 shown in FIG. 10 may have the behavior of shifting from coordinates 321, coordinates 322, coordinates 323, and to coordinates 324 in the feature quantity space 300 when the abnormality monitoring period includes four sections. In this case, the variation between adjacent sets of coordinates (e.g., a vector indicating the shift quantity) may be used as the determination index corresponding to each section. Actually, a plurality of determination indexes for each section obtained from a plurality of samples are statistically processed to determine a final determination index group.

The determination indexes in the determination index group may be, for example, thresholds, models, or functions specifying, for example, (1) the position and/or the distance in the feature quantity space, (2) the shift quantity in the feature quantity space, and (3) the shift direction (e.g., shifting toward the normal range or shifting toward the abnormal range) in the feature quantity space obtained for each section.

Finally, the determination index group 182 is determined as a hierarchal determination index group combining determination indexes defined for each hierarchy (each section). Each hierarchy (section) may have the same determination index.

The abnormal range may be used as the evaluation criterion instead of the normal range used in one or more embodiments.

As shown in FIG. 10, the controller 100 (analyzer) determines whether an integration of analysis results satisfies the predetermined evaluation criterion (either the normal range or the abnormal range). The integration includes each analysis result obtained from section data collected in each section included in the target abnormality monitoring period To (analysis target period).

An example user interface screen for defining the normal range as shown in FIG. 10 will now be described. As described above, the user defines the normal range (threshold range) using, for example, thresholds. The controller 100 or the support apparatus 200 then identifies the behavior of samples in the normal state based on the behavior of each sample included in the range defined by the user and the behavior of each sample excluded from the range. The controller 100 or the support apparatus 200 calculates the determination index group 182 based on the identified behavior of the samples (the behavior determined normal).

Any additional sample is determined either normal or abnormal based on the behavior, or specifically the tendency of the feature quantity (e.g., the shift direction or the shift quantity).

Figure 11B:
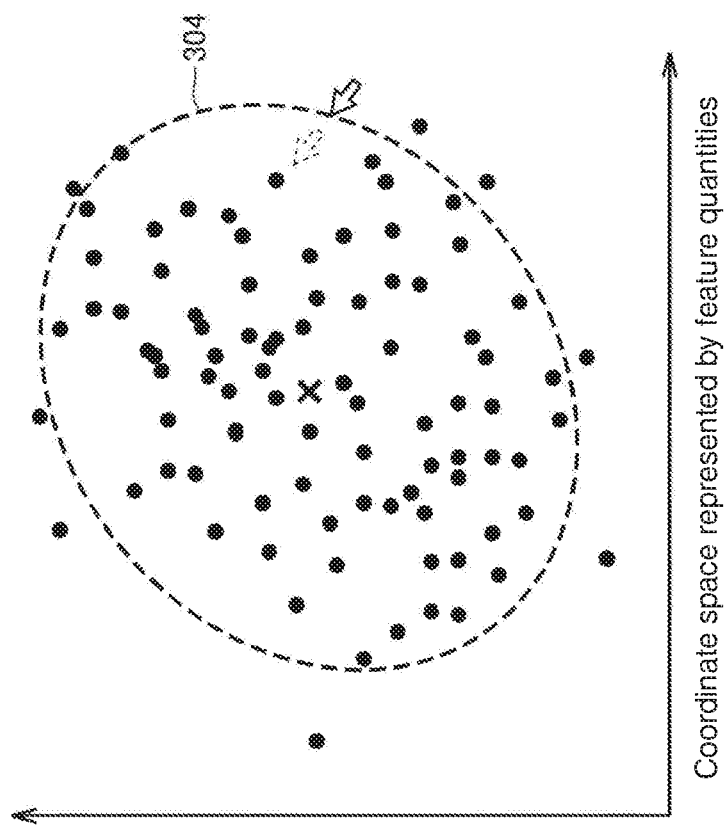
FIGS. 11A and 11B are diagrams each illustrating an example user interface screen for defining a threshold range in a feature quantity space shown in FIG. 10.
Figure 11A:
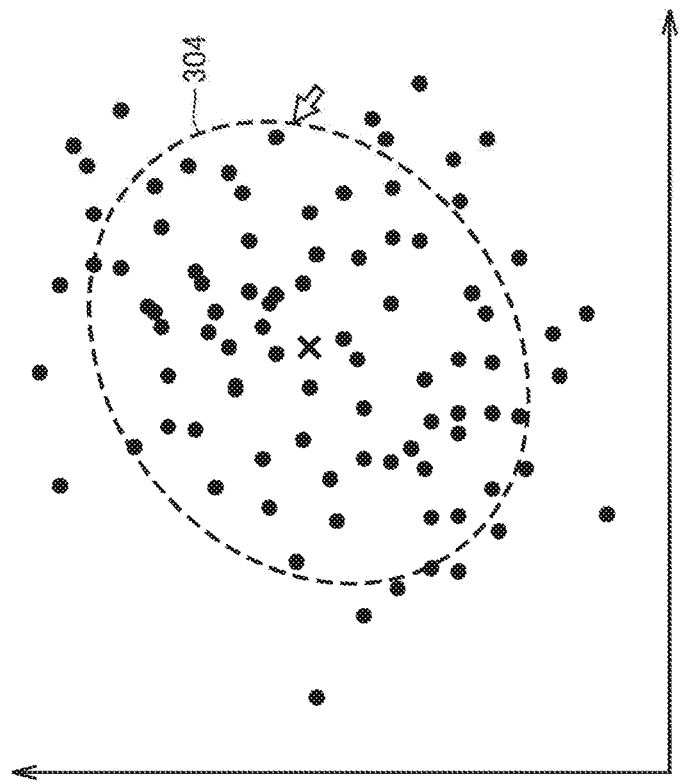

FIGS. 11A and 11B each show an example user interface screen for defining the threshold range 304 in the feature quantity space 300 shown in FIG. 10. In FIG. 11A, previously collected samples are plotted in the feature quantity space 300. The user refers to this sample distribution and defines the threshold range 304 by operating, for example, a mouse. As shown in FIG. 11B, the user can adjust the size of the threshold range 304 by further operating, for example, the mouse.

Figure 12:
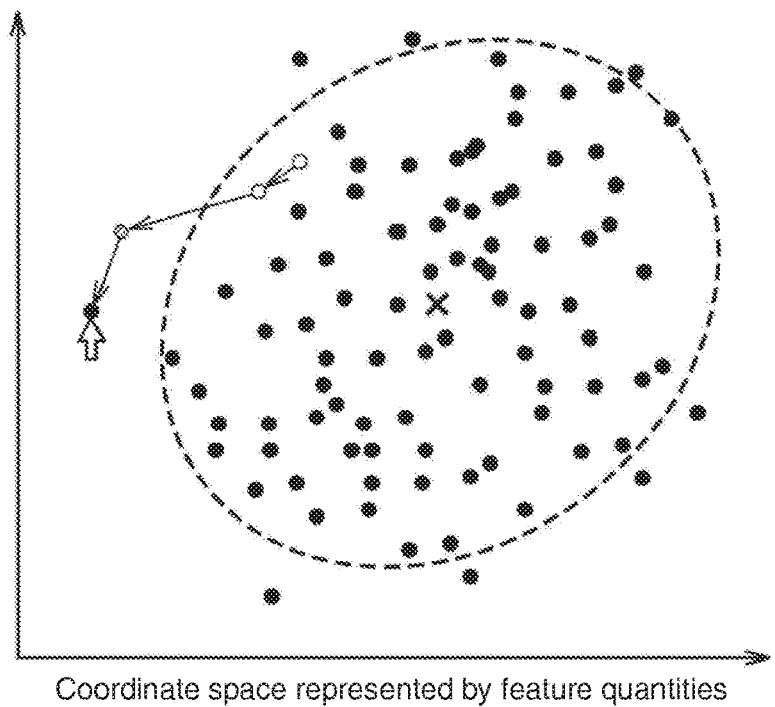
FIG. 12 is a diagram illustrating an example user interface screen for viewing the behavior of samples in a feature quantity space, such as in FIG. 10.

FIG. 12 shows an example user interface screen showing the behavior of the samples in the feature quantity space 300 shown in FIG. 10. As shown in FIG. 12, when the user selects a sample plotted in the feature quantity space 300, the controller 100 or the support apparatus 200 displays the behavior of the selected sample. The user can then adjust, for example, the size of the threshold range 304 while viewing the behavior of each sample.

With the procedure described above, the user can define the threshold range based on the samples plotted in the feature quantity space 300. In this manner, the controller 100 can receive the setting of the evaluation criterion (either the normal range or the abnormal range) either directly or through the support apparatus 200.

When, for example, the user defines the threshold considering that the maximum value for section data is equal to or less than 10 is normal and the maximum value in section data exceeding 10 is abnormal, the controller 100 or the support apparatus 200 evaluates the behavior of the analysis-target data approaching the defined threshold for every increment, and determines the determination index for each section.

The controller 100 or the support apparatus 200 may automatically define the evaluation criterion based on a predetermined logic, instead of the user defining the evaluation criterion on the user interface screen shown in FIG. 11. More specifically, the evaluation criterion can be defined through the processing described below.

(1) Method Using Labeled Samples

When a control target such as a manufacturing apparatus or a production line is designed to inspect workpieces, the inspection result from each workpiece is associated with the feature quantities (samples) obtained from the workpiece to obtain a labeled sample group. The labeled sample group undergoes clustering to define the evaluation criterion (either the normal range or the abnormal range). The normal range or the abnormal range resulting from the clustering can be used for defining the threshold range as the evaluation criterion. The processing for defining the evaluation criterion may be performed by the controller 100 or the support apparatus 200, or may be performed by, for example, a host server for managing manufacturing.

(2) Method Using Actual Results as Feedback

The abnormality detection based on the evaluation criterion defined by any method may receive feedback of the detection results from samples determined abnormal to the evaluation criterion to learn the evaluation criterion. For example, the user may actually check the samples determined abnormal and may input the validity of the determination to identify any incorrectly determined samples. The evaluation criterion is updated using the identified samples. This method corresponds to, for example, an approach for evaluating the performance result and then learning the evaluation criterion.

(3) Method Using Evaluation Functions

The evaluation functions for evaluating the degree of deviation or the degree of abnormality (e.g., a deviation obtained with the local outlier factor, or LOF, or the Mahalanobis distance) are used for a plurality of pre-labeled samples to automatically specify the threshold based on the scores calculated using the evaluation functions. The specified threshold may be used as the evaluation criterion without any change, or the range defined by the specified threshold may be used as the evaluation criterion.

The methods (1) to (3) described above are mere examples, and any other statistical method may be used.

H. Method for Determining the Number of Sections

In the analysis according to one or more embodiments described above, the abnormality monitoring period is divided into a plurality of sections, and the part of analysis-target data collected in each section is evaluated. A method for determining the number of sections will be described below.

Figure 13:
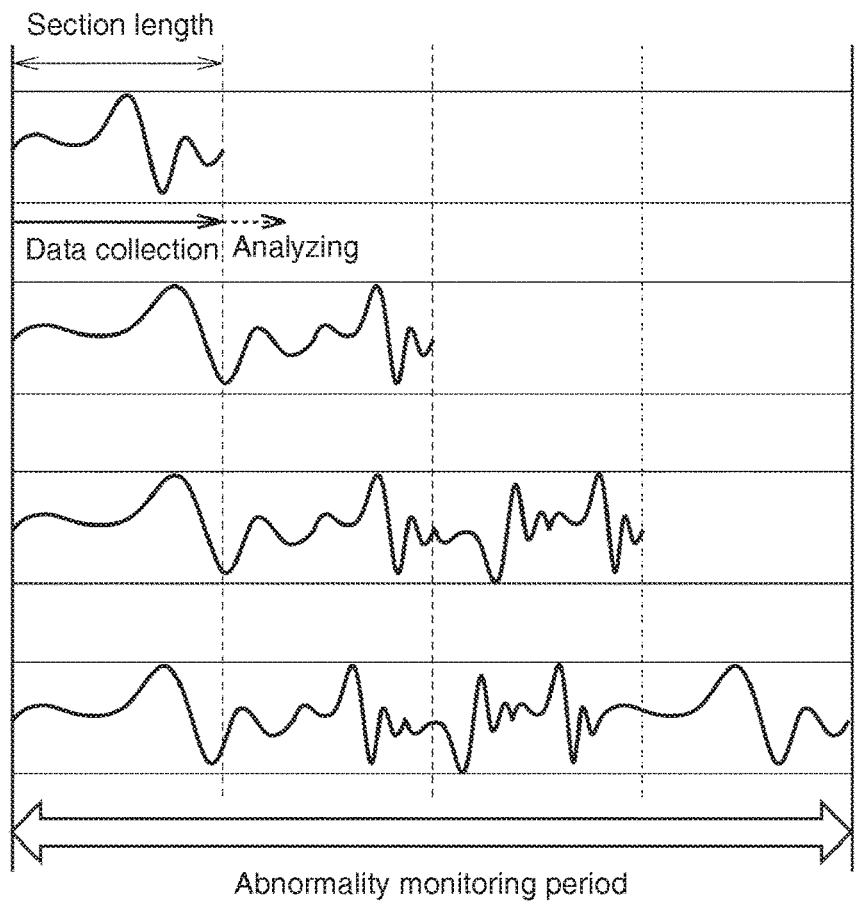
FIG. 13 is a diagram illustrating a method for determining the number of sections in an analysis according to one or more embodiments.

FIG. 13 is a diagram describing a method for determining the number of sections used in the analysis according to one or more embodiments. As shown in FIG. 13, the condition for dividing an abnormality monitoring period into sections is set to achieve enough resolution that can determine the behavior of analysis-target data (approaching or moving away) against the defined normal state based on analysis results obtained from section data collected in each section. The minimum section length is equivalent to the sampling cycle for target data (each section includes only the value of a single point).

The section data collected in each section is analyzed in parallel with data collection in a subsequent section in an unoccupied time at which no control operation is performed. Basically, the timing for outputting analysis results includes no delay unlike the analysis with the relevant technique shown in FIG. 4 described above.

Considering the conditions above, the methods described below may be used for determining the number of divided sections.

(1) The number of divided sections is determined based on the behavior of analysis-target data in the normal state. For example, the number of divided sections may be greater when the behavior of analysis-target data in the normal state largely changes. The number of divided sections may be smaller when the behavior of analysis-target data in the normal state changes gradually. The number of divided sections may be determined by the controller 100 or the support apparatus 200 based on a predetermined logic. In one or more embodiments, the user may determine the number of divided sections while monitoring changes in the behavior of analysis-target data in the normal state. As described above, the number of divided sections (the number of sections) may be determined based on chronological changes in values associated with the control target in the normal state.

(2) The number of divided sections is determined to allow visualization of the behavior of analysis-target data. To visualize the behavior of analysis-target data described below, the resolution is to be specified to allow chronological changes in the positions for analysis-target data to remain visible. The controller 100 or the support apparatus 200 may determine the resolution based on a predetermined logic to allow chronological changes in analysis-target data to remain visible. In one or more embodiments, the user may adjust the number of divided sections based on the view of the behavior of analysis-target data. As described above, the number of divided sections (the number of sections) may be determined to allow chronological changes in the values associated with a control target to remain visible.

(3) The number of divided sections N may be set systematically for an abnormality monitoring period. As the system setting, a default value set at the shipment may be set in a fixed manner, or the value may be freely set by the user.

As described above, the abnormality monitoring period may be divided in any manner based on the actual behavior of analysis-target data.

Although the divided sections in the abnormality monitoring period each have the same length in one or more embodiments, each section may have a different length. For example, the abnormality monitoring period may have an abnormality with a higher likelihood in its latter half in accordance with the characteristics of a control target, such as a manufacturing apparatus or a machine. In this case, the abnormality monitoring period may have longer sections in its first half and shorter sections in the latter half to include more sections in the latter half.

As described above, the abnormality monitoring period may be divided into any number of sections with any length.

I. Analysis Result Output Examples

Output examples of the analysis results provided through the analysis performed by the controller 100 according to one or more embodiments will now be described.

FIG. 14 is a schematic diagram showing output examples of analysis results obtained through the analysis according to one or more embodiments. The support apparatus 200 receiving an analysis result from the controller 100 may provide a user interface screen including the output examples shown in FIG. 14.

The output examples shown in FIG. 14 include statistics information 350 and an abnormality log 360. The statistics information 350 includes the number of abnormality determinations 352 showing the total number of times the abnormality determination has been performed, the number of abnormalities 354 showing the number of times an abnormality has been detected, and an abnormality determination section 356 showing the distribution of sections including detected abnormalities. The user may adjust thresholds or the number of divided sections by referring to the details of the statistics information 350.

The abnormality log 360 includes an abnormal occurrence time 362 showing the time at which each abnormality has been detected, and a workpiece number 364 showing manufacturing information about each workpiece at the abnormal occurrence time. The user may also determine whether the currently set threshold is appropriate by checking the conditions of the workpiece with a detected abnormality.

J. Advantages

Controllers such as PLCs are typically scheduled to cyclically perform control operations with a higher priority for enabling fast and precise control of control targets, and to perform supplemental processing other than control operations with a lower priority in an unoccupied time.

For supplemental processing, controllers may be requested to perform advanced information processing such as analyzing or machine-learning of data used for control operations and feeding back the execution results into subsequent control operations. Under the controller configuration described above, the information processing is performed with a lower priority, and the completion of information processing including data analysis typically depends on the analysis-target data (e.g., analysis cycles or the number of inputs), and the timing for completing such information processing cannot be scheduled. The information processing completes at varying timings. This may delay the feedback of data analysis results to the subsequent control operations, and may affect the control operations and their associated processing.

In the analysis according to one or more embodiments, the analysis target period (abnormality monitoring period To) is divided into a plurality of sections along the time axis. When the predefined result (typically, a detected abnormality) is output in one section while section data collected in each section is being analyzed, the subsequent sections included in the analysis target period will not be analyzed. This enables a predefined result to be obtained earlier than when data collected through the entire analysis target period is analyzed.

Further, the progress of the analysis performed with a lower priority can be monitored through other processing. The analysis can thus be managed even when the timing for completing the processing is not determined.

This configuration enables the analysis without affecting the speed and the precision of the performance of control operations in controllers.

In an analysis, a target analysis result is output at a midpoint in an analysis target period. To reduce the effect from the varying completion timings for analyses, the processing such as preventive control may be incorporated in the control operations. Further, each analysis can be completed early, thus allowing other processing performed in parallel by reducing the total computation load.

The embodiments disclosed herein are only illustrative in all respects and should not be construed to be restrictive. The scope of the present invention is not defined by the description given above but by the appended claims, and all changes that come within the meaning and range of equivalency of the claims are intended to fall within the claims.

REFERENCE SIGNS LIST 1 control system
2 first fieldbus
4 second fieldbus
6 upper network
8 field device group
12 remote I/O device
14 relay group
16, 124 I/O unit
18 image sensor
20 camera
22 servo driver
24 servomotor
100 controller
102 processor
104 chipset
106 main memory
108 secondary storage unit
110 network controller
112 USB controller
114 memory card interface
116 memory card
118, 120 fieldbus controller
122 local bus controller
150 PLC engine
152 control program
154 user program
156 analysis control program
158 analysis-target data generation program
160 variable management program
162 system variable
164 device variable
166 user variable
170 scheduler program
172 input program
174 output program
180 embedded database
182 determination index group
184 determination index
190 analyzer
192 analysis engine
194 progress result output unit
200 support apparatus
300 feature quantity space
302 reference position
304 threshold range
306 sample group
310 analysis-target data
320 normal sample
350 statistics information
352 number of abnormality determinations
354 number of abnormalities
356 abnormality determination section
360 abnormality log
362 abnormal occurrence time
364 workpiece number
400 external device
450 display

The invention claimed is:

1. A controller, comprising a processor configured with a program to perform operations comprising:
   operation as a control operation unit configured to cyclically perform a control operation for controlling a control target;
   operation as a data generator configured to cyclically generate data showing a chronological change in a value associated with the control target for each analysis target period comprising a plurality of sections;
   operation as an analyzer configured to collect and analyze the data generated by the data generator and output an analysis result for each of the analysis target periods; and
   operation as an execution control unit configured to cause the operation as the control operation unit and the operation as data generator to be performed in every control cycle, and to cause the operation as the analyzer to be performed during a time in which the operations as the control operation unit and the data generator are not performed, wherein the processor is configured with the program such that:
      operation as the data generator comprises operation as the data generator that sequentially outputs section data showing the chronological change in the value associated with the control target for each of the plurality of sections;
      operation as the analyzer comprises operation as the analyzer that analyzes the section data for each section based on a separate determination index corresponding to each section in parallel with the data generator sequentially outputting the section data such that the analyzer analyzes the section data in a section immediately following a section in which the section data was output by the data generator; and
      in response to an analysis of section data for a section included in the analysis target period showing a predefined result, the analyzer eliminates an analysis and a collection of section data for sections in the analysis target period subsequent to the section for which the analysis shows the predefined result and performs the analysis and the collection in a next analysis target period subsequent to the analysis target period, regardless of the predefined result.

2. The controller according to claim 1, wherein the processor is configured with the program to perform operations further comprising operation as a storage unit configured to store a determination index used in an analysis of the section data for each of the plurality of sections.

3. The controller according to claim 2, wherein the processor is configured with the program such that operation as the analyzer comprises operation as the analyzer that uses an analysis result of section data for a preceding section included in the analysis target period to analyze section data for a subsequent section included in the analysis target period.

4. The controller according to claim 3, wherein the processor is configured with the program such that operation as the analyzer determines whether an integration of an analysis result of section data for each section included in the analysis target period satisfies a predetermined evaluation criterion.

5. The controller according to claim 4, wherein the processor is configured with the program to perform operations further comprising operation as a setting reception unit configured to receive a setting of the evaluation criterion.

6. The controller according to claim 1, wherein the processor is configured with the program such that operation as the analyzer comprises operation as the analyzer that uses an analysis result of section data for a preceding section included in the analysis target period to analyze section data for a subsequent section included in the analysis target period.

7. The controller according to claim 6, wherein the processor is configured with the program such that operation as the analyzer comprises operation as the analyzer that determines whether an integration of an analysis result of section data for each section included in the analysis target period satisfies a predetermined evaluation criterion.

8. The controller according to claim 7, wherein the processor is configured with the program to perform operations further comprising operation as a setting reception unit configured to receive a setting of the evaluation criterion.

9. The controller according to claim 1, wherein the processor is configured with the program such that the plurality of sections are defined based on the chronological change in the value associated with the control target in a normal state.

10. The controller according to claim 1, wherein the processor is configured with the program such that the plurality of sections are defined to allow the chronological change in the value associated with the control target to be visible.

11. A non-transitory computer-readable storage medium storing a control program executed by a controller, the program causing the controller to perform operations comprising:
   cyclically performing a control operation for controlling a control target;
   generating data showing a chronological change in a value associated with the control target;
   collecting and analyzing the generated data and outputting an analysis result for a predetermined analysis target period comprising a plurality of sections; and
   performing the control operation and the generation of the data in every control cycle, and performing the collecting and analyzing during a time in which the control operation and generation of the data are not performed, wherein:
   generating the data comprises sequentially outputting the data showing the chronological change in the value associated with the control target as section data showing the chronological change in the value associated with the control target for each of the plurality of sections;
   analyzing the generated data comprises analyzing the generated section data for each section based on a separate determination index corresponding to each section in parallel with the generating of the data such that the analyzing of the data occurs for a section immediately following a section in which the section data was generated;
   outputting the analysis result comprises eliminating, in response to an analysis of section data for a section included in the analysis target period showing a predefined result, an analysis and a collection of section data sections in the analysis target period subsequent to the section for which the analysis shows the predefined result; and
   the program causes the controller to perform operations further comprising collecting and analyzing the generated data for a next target period subsequent to the predetermined analysis target period, regardless of the predefined result.

12. A control system, comprising:
a controller configured to control a control target; and
an input and output device connected to the controller and configured to collect data from the control target,
wherein the controller comprises a processor configured with a program to perform operations comprises:
operation as a control operation unit configured to cyclically perform a control operation for controlling a control target;
operation as a data generator configured to generate data showing a chronological change in a value associated with the control target; and
operation as an analyzer configured to collect and analyze the data generated by the data generator and output an analysis result for a predetermined analysis target period comprising a plurality of sections; and
operation as an execution control unit configured to cause the operation as the control operation unit and the operation as data generator to be performed in every control cycle, and to cause the operation as the analyzer to be performed during a time in which the operations as the control operation unit and the data generator are not performed, wherein the processor is configured with the program such that:
operation as the data generator comprises operation as the data generator that sequentially outputs the data showing the chronological change in the value associated with the control target as section data showing the chronological change in the value associated with the control target for each of the plurality of sections;
operation as the analyzer comprises operation as the analyzer that analyzes the section data for each section based on a separate determination index corresponding to each section in parallel with the data generator sequentially outputting the section data such that the analyzer analyzes the section data in a section immediately following a section in which the section data was output by the data generator; and
in response to an analysis of section data for a section included in the analysis target period showing a predefined result, the analyzer eliminates an analysis and a collection of section data for sections in the analysis target period subsequent to the section for which the analysis shows the predefined result and performs the analysis and the collection in a next analysis target period subsequent to the analysis target period, regardless of the predefined result.

13. A control method implemented by a controller, the method comprising:
cyclically performing a control operation for controlling a control target;
generating data showing a chronological change in a value associated with the control target;
collecting and analyzing the generated data and outputting an analysis result for a predetermined analysis target period comprising a plurality of sections; and
performing the control operation and generating the data in every control cycle, and performing the collecting and analyzing during a time in which the control operation and the generation of the data are not performed, wherein:
generating the data comprises sequentially outputting the data showing the chronological change in the value associated with the control target as section data showing the chronological change in the value associated with the control target for each of the plurality of sections;
analyzing the generated data comprises analyzing the generated section data for each section based on a separate determination index corresponding to each section in parallel with the generating of the data such that the analyzing of the data occurs for a section immediately following a section in which the section data was generated;
outputting the analysis result comprises eliminating, in response to an analysis of section data for a section included in the analysis target period showing a predefined result, an analysis and a collection of section data sections in the analysis target period subsequent to the section for which the analysis shows the predefined result; and
the method further comprises collecting and analyzing the generated data for a next target period subsequent to the predetermined analysis target period, regardless of the predefined result.

* * * * *